United States Patent [19]
Smith et al.

[11] Patent Number: 4,850,901
[45] Date of Patent: Jul. 25, 1989

[54] COMMUNICATIONS OUTLET

[75] Inventors: R. Bruce Smith; Virgil T. Bolick, Jr., both of Asheville; Kenneth W. Brownell, Jr., Marion, all of N.C.

[73] Assignee: Brintec Corporation, Willimantic, Conn.

[21] Appl. No.: 181,512

[22] Filed: Apr. 14, 1988

[51] Int. Cl.⁴ ............................................. H01R 23/02
[52] U.S. Cl. .................................. 439/676; 350/96.2; 439/540; 439/501
[58] Field of Search ............... 350/96.2; 439/501, 502, 439/536, 540, 571, 676

[56] References Cited

U.S. PATENT DOCUMENTS

| | | | |
|---|---|---|---|
| 4,290,664 | 9/1981 | Davis et al. | 439/676 X |
| 4,697,874 | 10/1987 | Nozick | 350/96.2 X |
| 4,712,234 | 12/1987 | Below et al. | 439/676 X |

FOREIGN PATENT DOCUMENTS

| | | | |
|---|---|---|---|
| 2531576 | 2/1984 | France | 439/540 |
| 2119120 | 11/1983 | United Kingdom | 350/96.2 |

Primary Examiner—Eugene F. Desmond
Attorney, Agent, or Firm—McCormick, Paulding & Huber

[57] ABSTRACT

A communications outlet having a baseplate assembly for mounting adjacent a wall surface includes bulkhead connectors and at least one modular plug receptacle for terminating optical and electrical cables. A spool barrel on the baseplate provides for the orderly storage of excess fiberoptic cable. The bulkhead connectors are carried by mounting members releasably secured to the baseplate which permits independent access to each terminated cable for movement to a position remote from the outlet to facilitate convenient servicing without risk of damage to the other terminated cables which comprise the outlet system. A cover cooperates with the mounting members to provide an enclosure for containing the terminated cables. An optional faceplate may be used in conjunction with the cover.

16 Claims, 2 Drawing Sheets

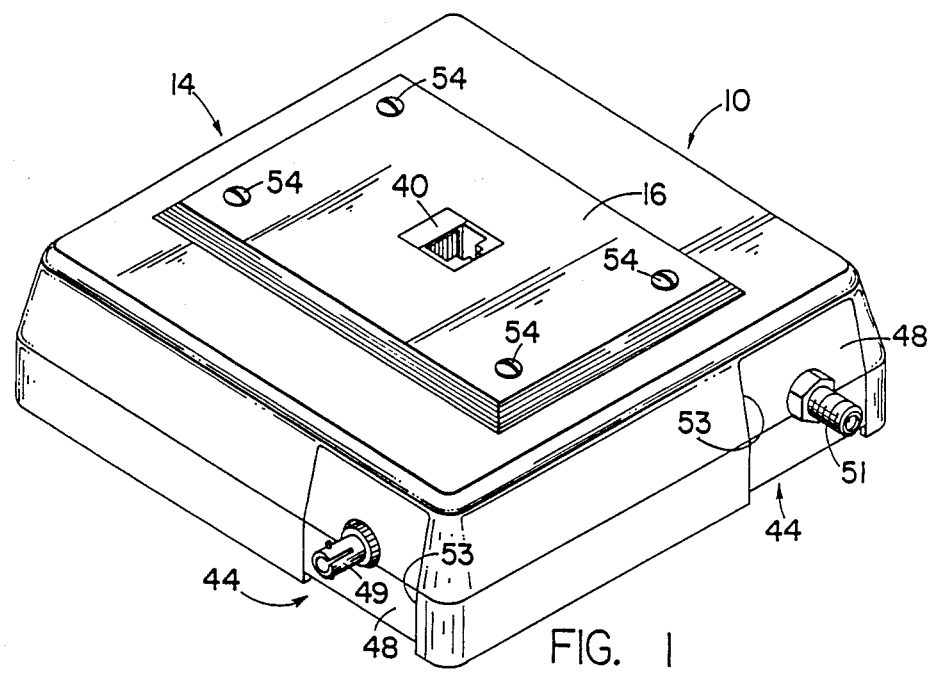
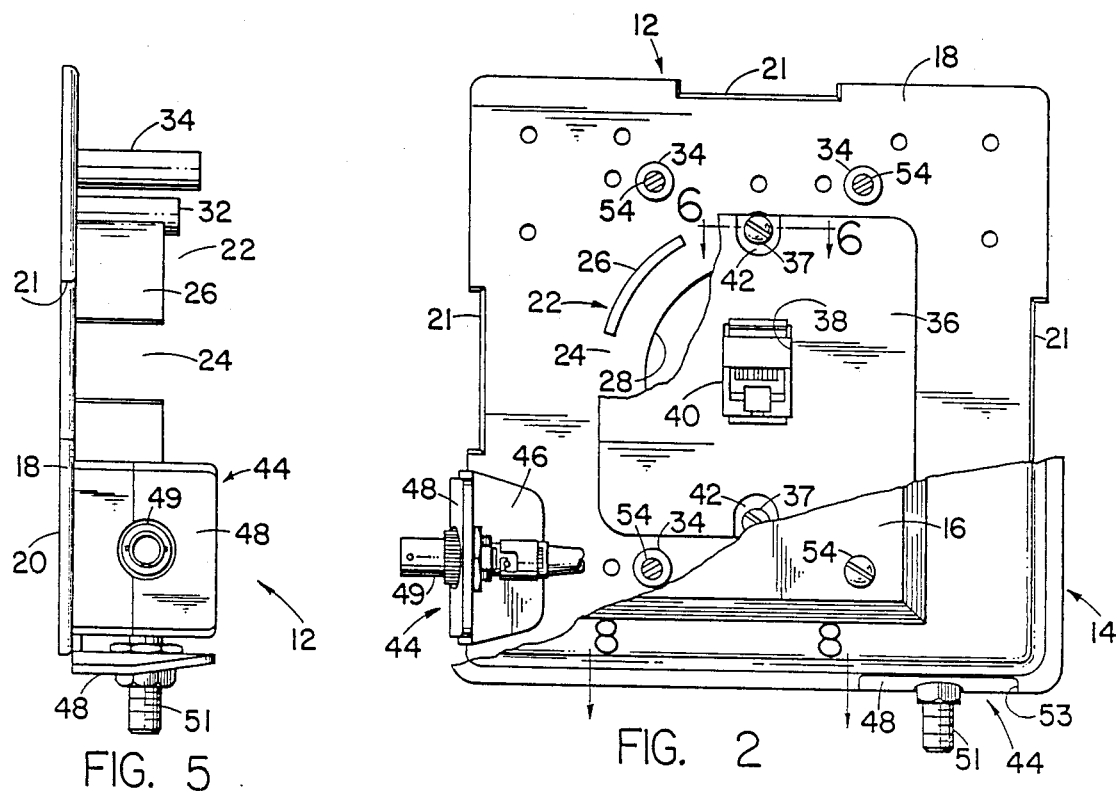

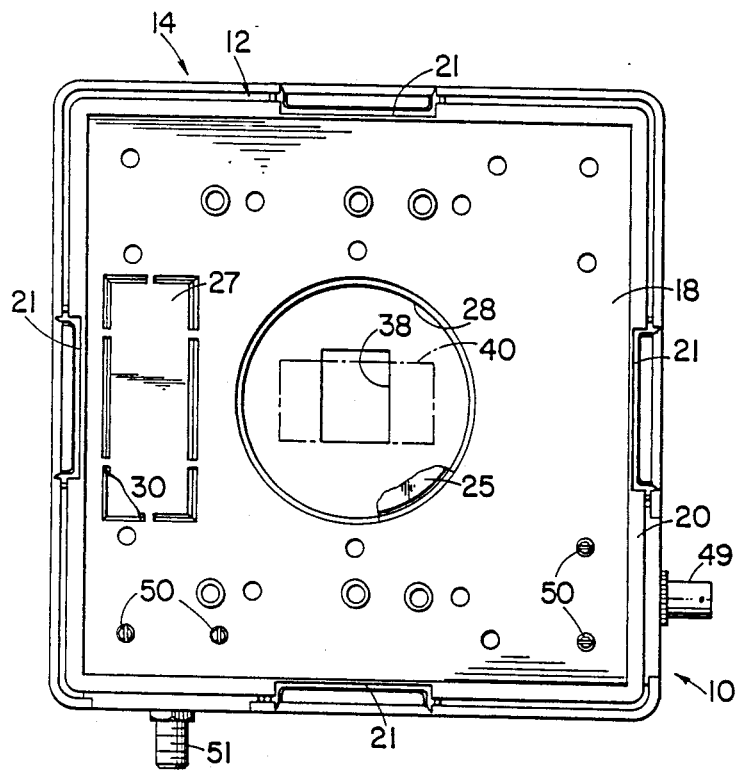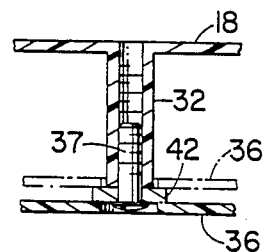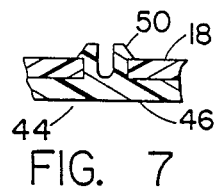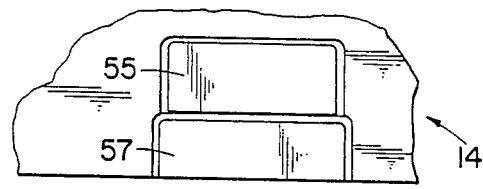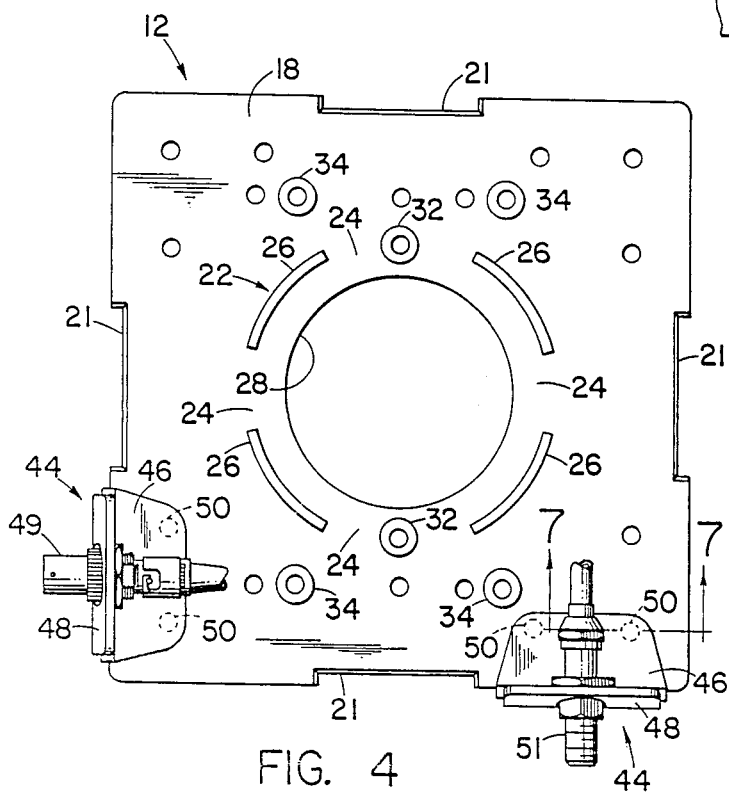

COMMUNICATIONS OUTLET

BACKGROUND OF THE INVENTION

This invention relates in general to communication outlets and deals more particularly with an improved outlet for terminating one or more optical cables and one or more electrically conductive cables at a common user station.

In such an outlet system it is usual to provide excess cable near the point of termination to facilitate convenient access to the terminated end portions of the cables for servicing, as may be required. However, it is particularly important that the excess optical cable be arranged in an organized manner to avoid excess bending stress which may result in damage to the optical fiber. It is also most desirable that the optical cable be arranged to avoid unnecessary handling to further reduce risk of cable damage.

Accordingly, it is the general aim of the present invention to provide an improved communications outlet having an arrangement for orderly storage of excess optical cable and wherein the end portion of each cable terminated at the outlet is independently accessible for movement to a position remote from the outlet to facilitate convenient servicing without risk of damage to other terminated cables which comprise the system.

SUMMARY OF THE INVENTION

In accordance with the present invention an improved communications outlet is provided for mounting on the surface of a wall or in covering relation to a wall outlet box recessed within a wall and has a baseplate assembly and a cover. The baseplate assembly includes a baseplate which has a rear mounting surface for engaging a substantially flat wall surface. Wall means carried by the baseplate defines a hollow spool barrel which projects from the frontal surface of the baseplate and has at least one opening through the side thereof. A means is provided for defining at least one hole through the baseplate through which communication cables may pass. An adapter plate releasably secured in spaced parallel relation to the baseplate and generally overlying flanging relation to the spool barrel has an aperture for receiving and retaining a modular connector. The assembly further includes at least one mounting member for supporting a bulkhead connector and means for releasably retaining the one mounting member in a selected one of a plurality of fixed mounting positions relative to the baseplate. The cover, which is releasably attached to the baseplate assembly, has an aperture for receiving and substantially complementing an associated portion of the modular connector carried by the adapter plate. The cover also has an opening for receiving and complementing an associated portion of the mounting member when the mounting member is retained in a selected one of its mounting positions relative to the baseplate assembly.

BRIEF DESCRIPTION OF THE DRAWINGS

FIG. 1 is a perspective view of a communications outlet embodying the present invention.

FIG. 2 is a front view of the communications outlet shown with a portion of the cover broken away to reveal the baseplate assembly therebehind.

FIG. 3 is a rear view of the communications outlet.

FIG. 4 is a front view of the baseplate assembly shown with the adapter plate removed therefrom.

FIG. 5 is a side elevational view of the baseplate assembly.

FIG. 6 is a somewhat enlarged fragmentary sectional view taken along the line 6—6 of FIG. 2.

FIG. 7 is a somewhat enlarged fragmentary sectional view taken along the line 7—7 of FIG. 4.

FIG. 8 is a fragmentary sectional view taken along the line 8—8 of FIG. 2.

DETAILED DESCRIPTION OF PREFERRED EMBODIMENT

Turning now to the drawings and referring first particularly to FIGS. 1 and 2, a communications outlet embodying the present invention is indicated generally by the reference numeral 10. The illustrated communications outlet 10 is particularly adapted for terminating at least one electrical cable and/or at least one fiberoptic cable at a user station and generally comprises a baseplate assembly, indicated generally at 12, for mounting on the surface of a wall or in covering relation to a wall outlet box (not shown) recessed within the wall, a cover, designated generally by the reference numeral 14, mounted on the baseplate assembly, and a faceplate 16 maintained in overlying relation to the frontal surface of the cover.

The various components which comprise the illustrated baseplate assembly 12 are preferably molded from durable, lightweight, dielectric plastic material and include a generally rectangular baseplate 18 which has a rearwardly projecting mounting surface 20 adjacent its peripheral edge for engaging a substantially flat wall surface or the like. Notches 21,21 open outwardly through the peripheral edges of the baseplate for a purpose which will be hereinafter explained. A generally cylindrical spool barrel, indicated generally at 22, projects in an axially forward direction from the frontal surface of the baseplate 18, as it appears oriented in the drawings, and has at least one opening 24 through the side thereof. Preferably, and as shown, the spool barrel 22 is defined by a plurality of spaced apart forwardly extending walls 26,26 of arcuate cross-section which cooperate with each other and with the baseplate to define the hollow spool barrel 22 which has a plurality of openings or slots 24,24 through its side wall. A plurality of openings are formed in the baseplate 18 for receiving fasteners which may be used to secure the baseplate directly to the surface of an associcted wall or to a single outlet box or a plurality of outlet boxes arranged in ganged relation to each other and recessed within the wall.

At least one opening in the baseplate through which communication cables may pass is defined by a breakaway or knock-out portion of the baseplate. The illustrated embodiment 10 includes two such knock-out portions 25 and 27, best shown in FIG. 3. The knockout portion 25 may be removed to define a generally circular hole 28 through a central portion of the baseplate and in communication with the hollow interior of the spool barrel 22. The other knock-out portion 27 may be removed to define a generally rectangular hole 30 through the baseplate and located between the spool barrel 22 and the outer peripheral edge of the baseplate, substantially as shown in FIG. 3, to provide another cable passageway through the baseplate externally of the spool barrel.

A pair of stand-off posts 32,32 extend forwardly from the frontal surface of the baseplate 18 at diametrically opposite sides of the spool barrel, substantially as shown, for a purpose which will be hereinafter evident. The baseplate assembly also includes a plurality of retaining posts 34,34 which project forwardly from the baseplate. The retaining posts 34,34 provide a means for releasably attaching the cover 14 to the baseplate assembly 12 and have free ends disposed within a common plane forward of the free ends of the stand-off posts 32,32 best shown in FIG. 5 wherein one of the posts 32,32 is shown.

A generally rectangular adapter plate 36, preferably molded from dielectric plastic material and shown in FIG. 2, is releasably secured in spaced parallel relation to the baseplate 18 by fasteners 37,37 engaged within threaded openings in the free ends of the stand-off posts 32,32. The adapter plate is disposed in generally overlying flanging relation to the spool barrel 22 and has at least one aperture 38 for receiving and retaining an electrical connector element which extends through the aperture. The illustrated connector element, indicated by the numeral 40, is a modular plug receptacle or wall outlet jack of a type widely used in the telecommunication industry and is particularly adapted for terminating an electrical cable having as many as four twisted pair electrical conductors. The adapter plate 36 may be arranged to carry one or more electrical connectors of the aforedescribed type or of another type, therefore, the wall outlet jack 40 will not be hereinafter described in detail. However, a complete description of the illustrated wall outlet jack 40 is found in U.S. Pat. No. 4,723,915 to Gentry, issued Feb. 9, 1988, assigned to the assignee of the present invention, and hereby adopted by reference as part of the present disclosure.

The frontal surface of the wall outlet jack 40 is disposed some distance forward of the frontal surface of the adapter plate 36 to which it is releasably attached. The adapter plate 36 is arranged for reversible mounting relative to the baseplate 18 and for this reason the adapter plate 36 has offset mounting pads 42,42 for engaging the free ends of the stand-off posts 32,32 in either of two mounting portions, as best shown in FIG. 6. The adapter plate 36 is spaced a greater distance from the baseplate 18 in one of its mounting positions, illustrated in full lines in FIG. 6, than in the other of its mounting positions shown in broken lines. This alternative mounting arrangment permits the communications outlet to be used with or without the faceplate 16, as will be hereinafter further discussed.

The baseplate assembly 12 further includes at least one mounting member indicated generally at 44 for supporting at least one bulkhead connector. However, the illustrated outlet connector includes a pair of mounting members 44,44. Each mounting member has a generally L-shaped cross-section, a mounting base 46, and a wall portion 48 which projects from the mounting base and is apertured to receive and retain a bulkhead connector such as the illustrated fiberoptic connector 49 or the coaxial cable connector 51. A pair of resilient spaced apart split mounting posts 50,50 project from each mounting base 46 and are received within an associated set of mounting holes formed in the baseplate 18 whereby each mounting member is releasably retained on the baseplate. The illustrated baseplate 18 has a plurality of sets of mounting holes at various locations so that each mounting member 44 may be mounted on the baseplate in a selected one of a plurality of mounting positions.

The cover 14 is preferably molded from dielectric plastic material and has a generally rectangular front wall and integral rearwardly extending side walls which define a rearwardly open cavity for receiving the baseplate assembly 12 therein. When the communications outlet 10 is mounted on an associated building wall the rear surfaces of the cover side walls engage the building wall surface. The cover side walls have cut-out portions 53,53, shown in FIG. 1, which receive and substantially complement the wall portions 48,48 when the cover 14 is assembled with the baseplate assembly 12. The cover is further arranged so that it may be assembled with the baseplate assembly 12 in at least two different positions so that the cut out portions 53,53 may accommodate the wall portions 48,48 when the mounting members 44,44 are mounted in selected mounting positions on the baseplate 18. The front wall has a central aperture for receiving and complementing the forward end portion of the wall outlet jack 40. Each of the cover side walls has breakaway portions 55 and 57 defined by lines of weakening formed on its inner surface, as shown in FIG. 8. Each breakaway portion is aligned with an associated notch 21 in the baseplate 18. One or more of the breakaway portions 55 and 57 may be removed from an associated side wall of the cover 4, as necessary, to accommodate a surface mounted raceway (not shown), which contains cables to be terminated by the communications outlet 10. The terminal end of the raceway is received within an associated notch 21. A plurality of mounting holes formed in the cover front wall receive fasteners 54,54 which engage threaded openings in the free ends of the retaining posts 34,34 to attach the cover 14 to the baseplate assembly 12.

Preparatory to mounting the baseplate assembly 10 on a wall outlet box or an associated building wall, either or both of the knock-out portions 25 and 27 may be separated from the baseplate, as necessary, to provide a single opening or a pair of openings through the baseplate to accommodate the cables to be terminated by the communications outlet 10. Thus, for example, an electrical cable having twisted pair conductors and terminated at the wall outlet jack 40 within the hollow spool barrel 22 may enter the spool barrel 22 through the circular hole 28. A fiberoptic cable terminated at the bulkhead connector 49 may, for example, pass through the rectangular opening 30 formed by removal of the knock-out panel 27. However, if the cables to be terminated enter the outlet 10 from one or more surface mounted raceways only the breakaway portion or portions 55 and 57 required to accommodate the raceways are removed. In this instance, the knock-out panels 25 and 27 are not removed.

A fiberoptic cable terminated by a fiberoptic connector mates with the inner end of the bulkhead connector 49. The mounting member 44 which carries the fiberoptic bulkhead connector 49 may be snapped out of connected engagement with the baseplate 18 so that the fiberoptic cable may be coupled to the bulkhead connector 49 at a location remote from the baseplate assembly 12. Thereafter, the excess optical cable is wound about the outer surface of the spool barrel 22 to avoid sharp bends in the optical cable which might damage it. After the excess optical cable has been wound in its storage position on the spool barrel, the mounting member 44 which carries the fiberoptic bulkhead connector 49 is snapped into engagement with the baseplate 18 at a selected location which avoids sharp bending of the optical cable.

The communications outlet 10 may be used either with or without the faceplate 16. In a hospital installation, for example, the frontal surface of the outlet cover 14 may be subjected to frequent cleaning with harsh detergents or germicides which may damage it. To overcome this problem such an installation may include a stainless steel faceplate such as the faceplate 16 which overlies the frontal surface of the cover 16.

When the communications outlet 10 is provided with both the cover 14 and the faceplate 16, the adapter plate 36 is mounted on the stand-off posts 32,32 in its full line position of FIG. 6 whereby the frontal surface of the wall outlet jack 40 is positioned a sufficient distance forward of the baseplate 18 to accommodate both the cover 14 and the faceplate 16 so that the frontal surface of the wall outlet jack 40 will be substantially flush with the surface of the faceplate 16 when the installation has been completed. However, if the faceplate 16 is to be omitted from the installation, the mounting position of the adapter plate is reversed, so that the adapter plate 36 is mounted on the stand-off post 32,32 in its broken line position of FIG. 6. In the latter position, the frontal surface of the wall outlet jack 40 will be flush with the frontal surface of the cover 14 when the installation is completed.

We claim:

1. A communications outlet comprising a baseplate assembly for mounting adjacent a wall surface, and a cover for said baseplate assembly, said baseplate assembly including a baseplate having a rear mounting surface for engaging a substantially flat wall surface, wall means defining a hollow spool barrel projecting from the frontal surface of said baseplate and having at least one opening through a side thereof, means for defining at least one hole through said baseplate for the passage of communication cables therethrough, an adapter plate having an aperture for receiving therethrough and retaining a modular connector, means for releasably securing said adapter plate in spaced parallel relation to said baseplate and generally overlying flanging relation to said spool barrel, at least one mounting member for supporting a bulkhead connector thereon, means for releasably retaining said one mounting member in a selected one of a plurality of fixed mounting positions relative to said baseplate, and means for releasably attaching said cover to said baseplate assembly, said cover having an aperture therethrough for receiving and substantially complementing an associated portion of said modular connector carried by said adapter plate and at least one cut-out portion defining an opening through said cover for receiving and complementing an associated portion of said mounting member when said mounting member is retained in a selected one of said mounting positions on said baseplate.

2. A communications outlet as set forth in claim 1 wherein said spool barrel is generally cylindrical and said wall means comprise a plurality of angularly spaced apart arcuate wall sections projecting from said baseplate.

3. A communications outlet as set forth in claim 1 wherein said one hole defining means comprises a knock-out portion of said baseplate.

4. A communications outlet as set forth in claim 1 wherein said one hole communicates with the interior of said spool barrel.

5. A communications outlet as set forth in claim 1 wherein said one hole is located between said spool barrel and an associated peripheral edge of said baseplate.

6. A communications outlet as set forth in claim 1 wherein said means for releasably securing said adapter plate comprises a plurality of stand-off posts projecting from the frontal surface of said baseplate.

7. A communications outlet as set forth in claim 1 wherein said means for releasably attaching said cover comprises a plurality of retaining posts projecting from the frontal surface of said baseplate.

8. A communications outlet as set forth in claim 1 wherein said means for releasably retaining said mounting member comprises means for releasably retaining said mounting member in snap engagement with said baseplate.

9. A communications outlet as set forth in claim 8 wherein said means for releasably retaining said mounting member comprises a plurality of resilient mounting posts on said mounting member and a plurality of mounting holes in said baseplate for receiving said resilient mounting posts therein.

10. A communications outlet as set forth in claim 1 wherein said adapter plate is reversably mountable relative to said baseplate and said adapter plate is spaced a greater distance from said baseplate in one of its mounting positions than in the other of its mounting positions.

11. A communications outlet as set forth in claim 10 including a faceplate overlaying the frontal surface of said cover when said adapter plate is mounted in said one mounting position and means for maintaining said faceplate in assembled relation to said cover.

12. A communiations outlet as set forth in claim 11 wherein said means for releasably attaching said cover to said baseplate comprises means for maintaining said faceplate in assembled relation to said cover.

13. A communications outlet comprising a baseplate assembly and a cover, said baseplate assembly including a baseplate having a rear mounting surface for engaging a flat wall surface and a hollow generally cylindrical spool barrel projecting forwardly from the frontal surface of said baseplate and defined by a plurality of angularly spaced apart wall sections projecting from said baseplate and having spaces therebetween, punch-out means for defining at least one hole in said baseplate, a pair of spaced apart stand-off posts projecting from the frontal surface of said baseplate, a plurality of retaining posts projecting from the frontal surface of said baseplate, an adapter plate having an aperture therethrough, fastener means for releasably securing said adapter plate to said stand-off posts in generally parallel spaced relation to said baseplate and in generally overlying and flanging relation to said spool barrel, a modular plug receptacle received in said aperture and retained in snap assembly with said adapter plate, a generally L-shaped connector mounting member having a mounting base and a mounting wall projecting from said mounting base, means for releasably retaining said connector mounting member in a selected one of a plurality of mounting positions on said baseplate and including a plurality of sets of mounting holes in said baseplate and a set of resilient mounting posts projecting from said mounting base and received in snap engagement within a selected one of said set of said mounting holes, a fiber-optic bulkhead connector mounted on and projecting through said mounting wall, and means for releasably attaching said cover to said baseplate assembly in covering relation thereto and including fastener means for threadably engaging said retaining posts, said cover having an aperture therethrough receiving and complementing an associated portion of said modular plug receptacle, and including a cut-out portion for receiving and complementing said mounting wall when said mounting member is releasably retained in each of said mounting positions.

14. A communications outlet as set forth in claim 13 including a faceplate and means for maintaining said faceplate in overlying relationship to the frontal surface of said cover.

15. A communications outlet as set forth in claim 14 wherein said means for releasably attaching said cover comprises said means for maintaining said faceplate.

16. A communications outlet as set forth in claim 13 including at least one breakaway portion of said cover for defining an opening to receive generally and complement a surface mounted raceway when said cover is attached to said baseplate assembly.

* * * * *